United States Patent
Gupta et al.

(10) Patent No.: US 10,212,043 B1
(45) Date of Patent: Feb. 19, 2019

(54) PROACTIVE LINK LOAD BALANCING TO MAINTAIN QUALITY OF LINK

(71) Applicant: Citrix Systems, Inc., Fort Lauderdale, FL (US)

(72) Inventors: Anup Lal Gupta, Bangalore (IN); Praveen Raja Dhanabalan, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 13 days.

(21) Appl. No.: 15/660,147

(22) Filed: Jul. 26, 2017

(51) Int. Cl.
- *G01R 31/08* (2006.01)
- *H04L 12/24* (2006.01)
- *H04L 12/803* (2013.01)
- *H04L 12/26* (2006.01)

(52) U.S. Cl.
CPC .......... *H04L 41/147* (2013.01); *H04L 43/087* (2013.01); *H04L 43/0811* (2013.01); *H04L 43/0829* (2013.01); *H04L 43/0882* (2013.01); *H04L 47/125* (2013.01)

(58) Field of Classification Search
CPC .................................................. H04L 41/147
See application file for complete search history.

(56) References Cited

U.S. PATENT DOCUMENTS

| | | | | |
|---|---|---|---|---|
| 6,567,408 B1* | 5/2003 | Li | ........................ | H04L 12/5601 370/395.31 |
| 6,671,724 B1* | 12/2003 | Pandya | .................... | H04L 29/06 370/236 |
| 6,829,347 B1* | 12/2004 | Odiaka | .................... | H04L 45/00 379/114.02 |
| 2012/0013748 A1* | 1/2012 | Stanwood | ........... | H04L 41/5022 348/192 |
| 2014/0079043 A1* | 3/2014 | Montemurro | ..... | H04W 52/0216 370/338 |
| 2015/0295856 A1* | 10/2015 | Karthikeyan | ........... | H04L 65/80 370/230 |
| 2018/0001184 A1* | 1/2018 | Tran | ..................... | H04N 5/2257 |

* cited by examiner

*Primary Examiner* — Gerald A Smarth
(74) *Attorney, Agent, or Firm* — Foley & Lardner LLP; Christopher J. McKenna

(57) ABSTRACT

Disclosed embodiments describe systems and methods for predicting health of a link. A device in communication with a link can identify profile information of a stream of network traffic traversing the link. The device can determine a first prediction of health of the link by applying one or more rules to the plurality of parameters of the profile information. The device can determine a second prediction of health of the link by applying a classifier to one or more timed sequences of the plurality of parameters of the profile information. The device can establishes a respective weight for each of the first prediction of health and the second prediction of heath. The device can select, using the respective weight, between the first prediction of health and the second prediction of health to provide a predictor of the health of the link.

20 Claims, 9 Drawing Sheets

PROACTIVE LINK LOAD BALANCING TO MAINTAIN QUALITY OF LINK

FIELD OF THE DISCLOSURE

The present application generally relates to methods and systems for predicting the health of a network link.

BACKGROUND

Data can be transmitted across one or more links in a network. The state of a link in the network can affect the quality of the network connection and, therefore, the quality of the transmission. For example, a link in a bad state can experience greater packet loss, jitter or latency as compared to a link in a good state. Due to the technical challenges in identifying the state of a link or a cause of the state of the link, it can be difficult to select a link for data transmission or improve the state of a link.

SUMMARY

This Summary is provided to introduce a selection of concepts in a simplified form that are further described below in the Detailed Description. This Summary is not intended to identify key features or essential features, nor is it intended to limit the scope of the claims included herewith.

The present disclosure is directed to systems and methods for predicting health of a link. In a network, such as a wide area network (WAN), it can be challenging to identify links that are in a good state, identify the cause of a link entering a bad state, predict the future state of a link, or proactively prevent a link from entering a bad state. A device intermediary between a client and a server, such as a network appliance or a middlebox, attempts to facilitate or improve load balancing of data transmission across links by utilizing links that are in a good state to transmit data. Middleboxes that perform WAN virtualization can be configured as a pair of devices connected via different WAN networks. The middleboxes can determine the best link to send the high priority packets (traffic) by determining the packet loss, latency, jitter, congestion and other network entities from each of the links. For example, given a set of links between two middleboxes, network throughput or reliability can be improved by load balancing the data across good links that experience less packet drops, latency and jitter, as opposed to bad links. An active link (path) between the middleboxes can either be in a good state or a bad state based on the loss, latency, and jitter. The middlebox can be configured to choose a link or path that is in a good state as opposed to a link that is in a bad state (e.g., a link that experiences more packet loss, jitter and latency) to provide better QoS for the connections. Thus, maintaining more links in a good state can provide better quality of service (QoS) for the connections as it can provide the middlebox with more options from which to choose a link to send packets.

Factors that can cause a link to enter a bad state include, for example, high latency, high packet drop or high jitter. If the device can determine the cause of the link entering the bad state, the device can recover the link from that state. For example, if high jitter is the cause for a link from going bad, the device can remove the factors from the appliance end for that link that cause high jitter, thereby preventing the link from going to bad state.

Further, since the device selects good links to transport the packets reliably, the device can increase the load on good links. This can cause the good links to experience high jitter and loss and, eventually, enter a bad state. Systems and methods of the present disclosure can improve the use of the links by avoiding this cascading effect by predicting a cause of a link entering a bad state, and performing an action based on the cause to prevent the link from entering the bad state, such as redistributing traffic of certain connections. The intermediary device can prevent the best links from entering a bad state, and maintain a higher number of good quality links in the WAN.

Thus, systems and methods of the present disclosure allow a device to dynamically predict link health and take action based on the link health to prevent the link from going bad. Proactively managing link health or quality can prevent cascading effects of links going bad due to overloading. Further, the device can maintain a greater number of links in a good state.

To do so, the device can use predictive algorithms to detect a cause of a link entering a bad state or, a cause of a link entering a bad state in the future, and take actions based on the predicted cause to prevent the link from entering the bad state or recovering the link from the bad state. Thus, the device can maintain a high number of good quality links.

The device can identify, determine or predict the state (or health) of a link based on one or more parameters. The device can perform proactive connection management based on the parameters. For example, the device can be configured with a hybrid prediction mechanism that can include a set of static rules and an online machine learning classifier. The static rules can be empirically composed of link health defining parameters. The online machine learning classifier can learn over these parameters. The prediction output by the static rules and the prediction output by the online machine learning classifier can be weighted and combined to generate a final prediction that indicates whether a link is entering a bad state, as well as the cause of the link entering the bad state. The device can perform a proactive action or decision based on the cause in order to maintain the state or health of the link. The device can apply weights to the predictions that can be a function of time and accuracy of the respective tools.

To detect what causes a link to go to a bad state, the device can identify one or more variables, such as high packet drop, high jitter or high latency. The device can determine that the link can enter a bad state if any one or more of these variables is greater than a threshold. The device can predict that a link would experience one or more of high packet drop, high jitter or high latency based on patterns and relationships. These patterns and relationships can be referred to as a feature set.

For example, an increase in packet drop can be determined from a combination of: increase in link utilization; increase in link latency; synchronization of window size; rate of increase of number of connections (burst); and type of connections (e.g., bulk, chatty, or stream). In another example, the increase in jitter can be determined by: difference in inter-arrival time in the queue, and the inter-arrival time to send the packets from the queue; average queue size; and current queue size. In yet another example, the increase in packet drop can be determined by: queue size; minimum latency; type of connection; and number of connections. The device can leverage the relationships across the various learning algorithms, by using prediction algorithms to predict what parameters can cause the link to fail (or enter a bad state) in the future.

At least one aspect of the present disclosure is directed to a method for predicting health of a link. A device in communication with a link can identify profile information of a stream of network traffic traversing the link. The profile information can include a plurality of parameters about the link. The device can determine a first prediction of health of the link by applying one or more rules to the plurality of parameters of the profile information. The device can determine a second prediction of health of the link by applying a classifier to one or more timed sequences of the plurality of parameters of the profile information. The device can establish a respective weight for each of the first prediction of health and the second prediction of heath. The device can use the respective weight to select between the first prediction of health and the second prediction of health to provide a predictor of the health of the link.

In some embodiments, the plurality of parameters the device can collect for the profile information includes two or more of the following: latency, utilization, loss of packets, jitter, queue size, number of connections, and type of connection. In some embodiments, the device applies the one or more rules as a function of the plurality of parameters comprising loss of packets, latency and jitter. The function can be a sum of multiplying each of the plurality of parameters by a respective constant.

In some embodiments, the device can create the one or more timed sequences of the plurality of parameters responsive to the health of the link one of climbing above or falling below a predetermined threshold. The device can apply a function to a first weight of the first prediction of health and a second weight of the second prediction of health to select between the first prediction of health and the second prediction of health.

In some embodiments, the device can take an action associated with the link responsive to the predictor of the health of the link. The device can identify, via the selected predictor of the health of the link, that the link has high latency based on a predetermined latency threshold. The device can move one or more connections with packet occupancy greater than a predetermined occupancy threshold in a queue to one or more other links. In some embodiments, the device can identify, via the selected predictor of the health of the link, that the link has high jitter based on a predetermined jitter threshold, and move one or more connections with a difference in inter-arrival time into the device and inter-departure time of a queue of the device is above a predetermined threshold. In some embodiments, the device can identify, via the selected predictor of the health of the link, that the link has high loss based on a predetermined loss threshold and transmitting by the device a predetermined portion of bandwidth via the link.

In another aspect, the present disclosure is directed to a system for predicting health of a link. The system can include a device that includes a processor coupled to memory. The device can be in communication with a link. The device can identify profile information of a stream of network traffic traversing the link. The profile information comprising a plurality of parameters about the link. The system can include a rule engine that determines a first prediction of health of the link by applying one or more rules to the plurality of parameters of the profile information. The system can include a classifier that determines a second prediction of health of the link by applying a classifier to one or more timed sequences of the plurality of parameters of the profile information. The system can include a weight adjuster that establishes a respective weight for each of the first prediction of health and the second prediction of heath. The system can include a prediction selector that selects, using the respective weight, between the first prediction of health and the second prediction of health to provide a predictor of the health of the link.

In some embodiments, the plurality of parameters the device collects for the profile information includes two or more of the following: latency, utilization, loss of packets, jitter, queue size, number of connections, and type of connection. In some embodiments, the rule engine can apply the one or more rules as a function of the plurality of parameters comprising loss of packets, latency and jitter. In some embodiments, the function is a sum of multiplying each of the plurality of parameters by a respective constant. In some embodiments, the device creates the one or more timed sequences of the plurality of parameters responsive to the health of the link one of climbing above or falling below a predetermined threshold.

In some embodiments, the predictor selector applies a function to a first weight of the first prediction of health and a second weight of the second prediction of health to select between the first prediction of health and the second prediction of health. In some embodiments, the device can take an action associated with the link responsive to the predictor of the health of the link. The device can identify, via the selected predictor of the health of the link, that the link has high latency based on a predetermined latency threshold, and move one or more connections with packet occupancy greater than a predetermined occupancy threshold in a queue to one or more other links. The device can identify, via the selected predictor of the health of the link, that the link has high jitter based on a predetermined jitter threshold, and move one or more connections with a difference in inter-arrival time into the device and inter-departure time of a queue of the device is above a predetermined threshold. The device can identify, via the selected predictor of the health of the link, that the link has high loss based on a predetermined loss threshold and transmit by the device a predetermined portion of bandwidth via the link.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure can be repeated in one or more subsequent figures without additional description in the specification in order to provide context for other features, and not every element can be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents can be helpful:

Section A describes a network environment and computing environment which can be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for predicting health of a link.

A. Network and Computing Environment

Figure 1A:
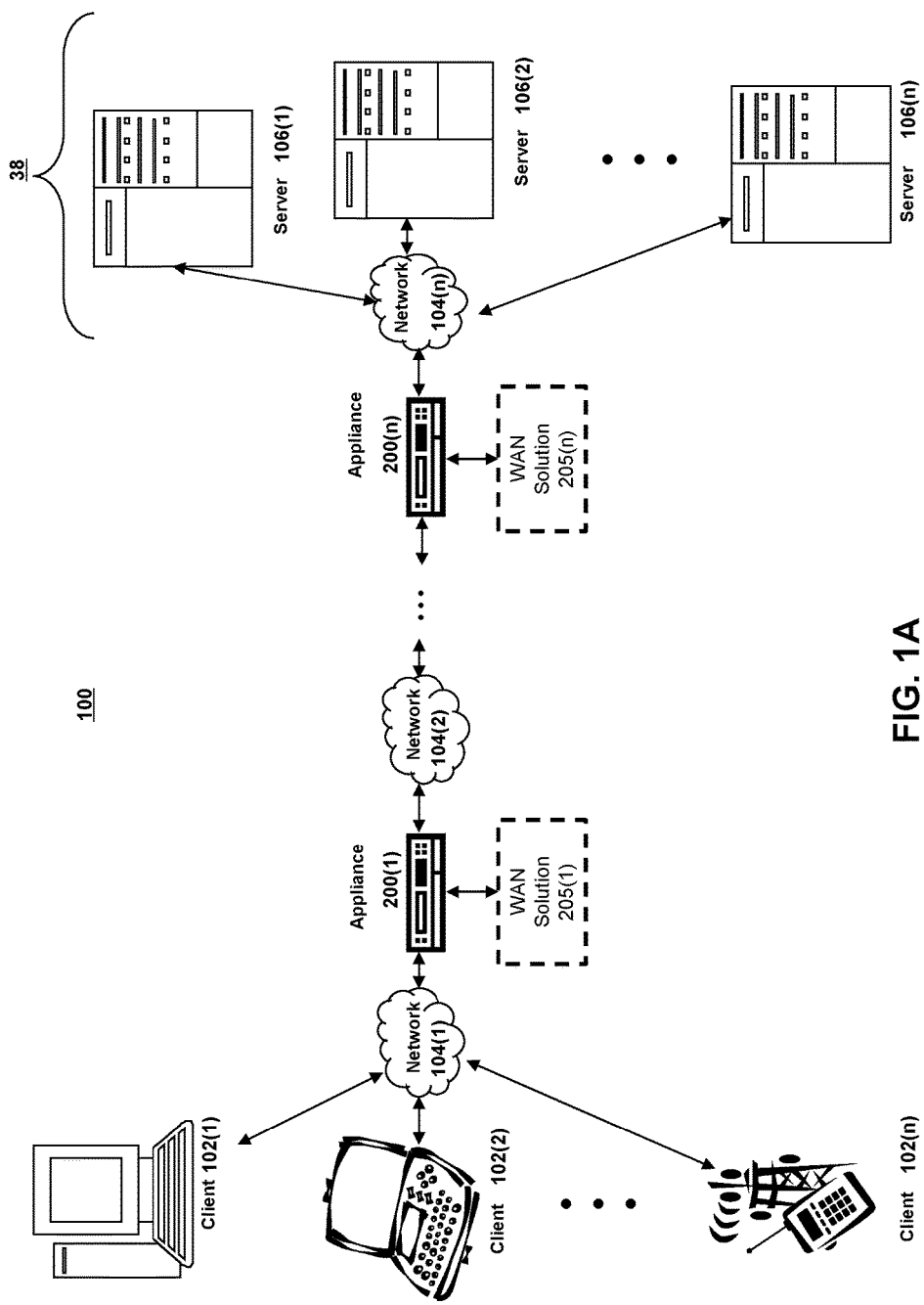
FIG. 1A is a block diagram of a network computing system, in accordance with an illustrative embodiment.

Referring to FIG. 1A, an illustrative network environment 100 is depicted. Network environment 100 can include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 can communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 can be on the same network 104. The various networks 104 can be the same type of network or different types of networks. For example, in some embodiments, network 104(1) can be a private network such as a local area network (LAN) or a company Intranet, while network 104(2) and/or network 104(n) can be a public network, such as a wide area network (WAN) or the Internet. In other embodiments, both network 104(1) and network 104(n) can be private networks. Networks 104 can employ one or more types of physical networks and/or network topologies, such as wired and/or wireless networks, and can employ one or more communication transport protocols, such as transmission control protocol (TCP), internet protocol (IP), user datagram protocol (UDP) or other similar protocols.

As shown in FIG. 1A, one or more appliances 200 can be located at various points or in various communication paths of network environment 100. For example, appliance 200 can be deployed between two networks 104(1) and 104(2), and appliances 200 can communicate with one another to work in conjunction to, for example, accelerate network traffic between clients 102 and servers 106. In other embodiments, the appliance 200 can be located on a network 104. For example, appliance 200 can be implemented as part of one of clients 102 and/or servers 106. In an embodiment, appliance 200 can be implemented as a network device such as NetScaler® products sold by Citrix Systems, Inc. of Fort Lauderdale, Fla.

As shown in FIG. 1A, one or more servers 106 can operate as a server farm 38. Servers 106 of server farm 38 can be logically grouped, and can either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 can seek access to hosted applications on servers 106.

As shown in FIG. 1A, in some embodiments, appliances 200 can include, be replaced by, or be in communication with, one or more additional appliances, such as WAN solution appliances 205(1)-205(n), referred to generally as WAN solution appliance(s) 205. WAN solution appliance can include, for example, a WAN virtualized solution or a WAN optimizer. For example, WAN solution appliance 205 can accelerate, cache, compress, manage or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 can be a performance enhancing proxy or a WAN solution or optimization controller. In one embodiment, appliance 205 can be implemented as CloudBridge® products sold by Citrix Systems, Inc. of Fort Lauderdale, Fla.

Figure 1B:
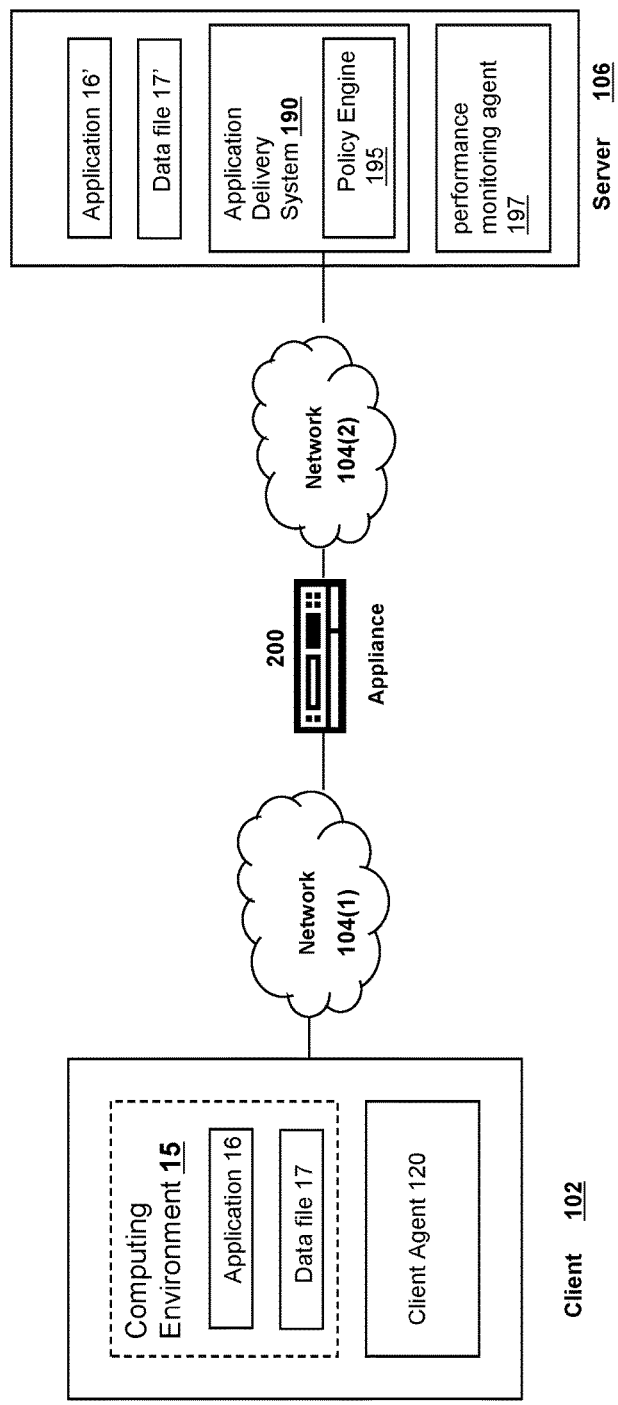
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 can include an application delivery system 190 for delivering a computing environment, application, and/or data files to one or more clients 102. Client 102 can include client agent 120 and computing environment 15. Computing environment 15 can execute or operate an application 16 that accesses, processes or uses a data file 17. Computing environment 15, application 16 and/or data file 17 can be delivered via appliance 200 and/or the server 106.

Appliance 200 can accelerate delivery of all or a portion of computing environment 15 to a client 102, for example by the application delivery system 190. For example, appliance 200 can accelerate delivery of a streaming application and data file processable by the application from a data center to a remote user location by accelerating transport layer traffic between a client 102 and a server 106. Such acceleration can be provided by one or more techniques, such as: 1) transport layer connection pooling, 2) transport layer connection multiplexing, 3) transport control protocol buffering, 4) compression, 5) caching, or other techniques. Appliance 200 can also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 can deliver computing environment 15 to a user (e.g., client 102), remote or otherwise, based on authentication and authorization policies applied by policy engine 195. A remote user can obtain a computing environment and access to server stored applications and data files from any network-connected device (e.g., client 102). For example, appliance 200 can request an application and data file from server 106. In response to the request, application delivery system 190 and/or server 106 can deliver the application and data file to client 102, for example via an application stream to operate in computing environment 15 on client 102, or via a remote-display protocol or otherwise via remote-based or server-based computing. In an embodiment, application delivery system 190 can be implemented as any portion of the Citrix Workspace Suite™ by Citrix Systems, Inc., such as XenApp® or XenDesktop®.

Policy engine 195 can control and manage the access to, and execution and delivery of, applications. For example, policy engine 195 can determine the one or more applications a user or client 102 can access and/or how the application should be delivered to the user or client 102, such as a server-based computing, streaming or delivering the application locally to the client 120 for local execution.

For example, in operation, a client 102 can request execution of an application (e.g., application 16') and application delivery system 190 of server 106 determines how to execute application 16', for example based upon credentials received from client 102 and a user policy applied by policy engine 195 associated with the credentials. For example, application delivery system 190 can enable client 102 to receive application-output data generated by execution of the application on a server 106, can enable client 102 to execute the application locally after receiving the application from server 106, or can stream the application via network 104 to client 102. For example, in some embodiments, the application can be a server-based or a remote-based application executed on server 106 on behalf of client 102. Server 106 can display output to client 102 using a thin-client or remote-display protocol, such as the Independent Computing Architecture (ICA) protocol by Citrix Systems, Inc. of Fort Lauderdale, Fla. The application can be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 can include a performance monitoring service or agent 197. In some embodiments, a dedicated one or more servers 106 can be employed to perform performance monitoring. Performance monitoring can be performed using data collection, aggregation, analysis, management and reporting, for example by software, hardware or a combination thereof. Performance monitoring can include one or more agents for performing monitoring, measurement and data collection activities on clients 102 (e.g., client agent 120), servers 106 (e.g., agent 197) or an appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents can monitor, measure, collect, and/or analyze data on a predetermined frequency, based upon an occurrence of given event(s), or in real time during operation of network environment 100. The monitoring agents can monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics can be monitored.

The monitoring agents can provide application performance management for application delivery system 190. For example, based upon one or more monitored performance conditions or metrics, application delivery system 190 can be dynamically adjusted, for example periodically or in real-time, to optimize application delivery by servers 106 to clients 102 based upon network environment performance and conditions.

In described embodiments, clients 102, servers 106, and appliances 200 and 205 can be deployed as and/or executed on any type and form of computing device, such as any desktop computer, laptop computer, or mobile device capable of communication over at least one network and performing the operations described herein. For example, clients 102, servers 106 and/or appliances 200 and 205 can each correspond to one computer, a plurality of computers, or a network of distributed computers such as computer 101 shown in FIG. 1C.

Figure 1C:
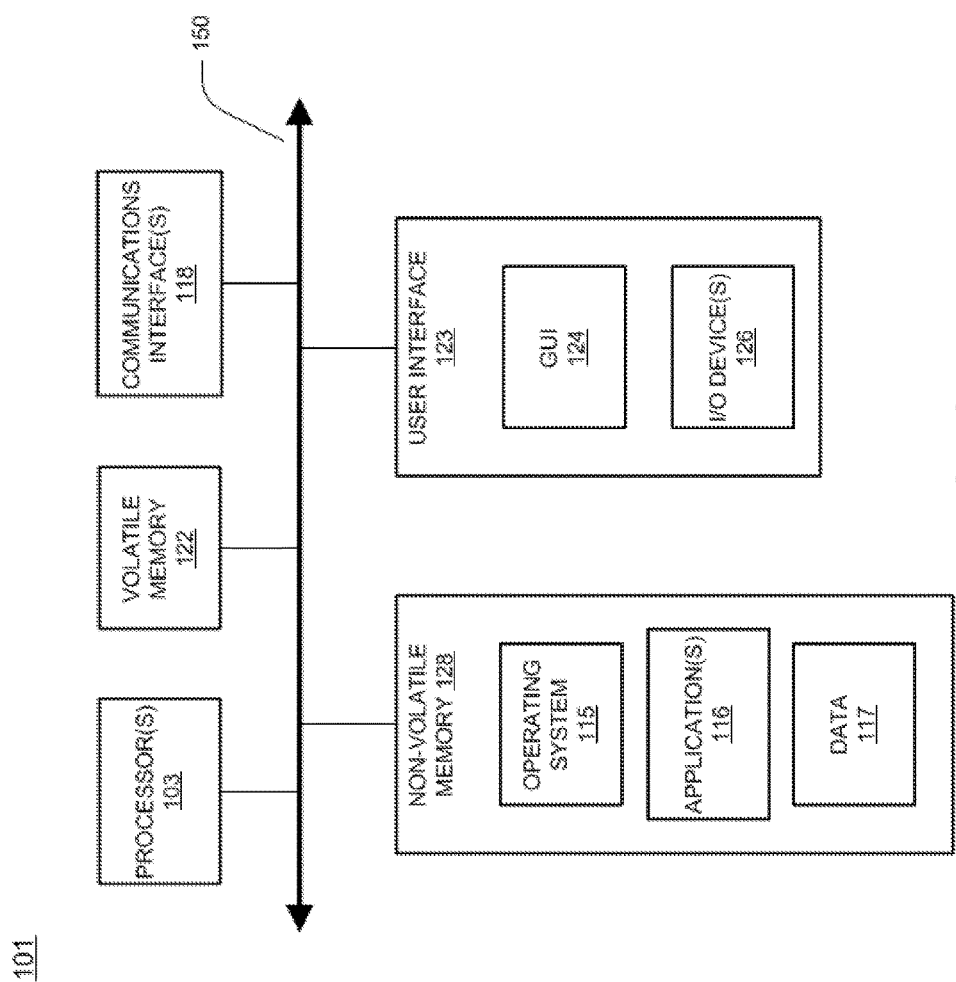
FIG. 1C is a block diagram of a computing device, in accordance with an illustrative embodiment.

As shown in FIG. 1C, computer 101 can include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 can include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data can be entered using an input device of GUI 124 or received from I/O device(s) 126. Various elements of computer 101 can communicate via communication bus 150. Computer 101 as shown in FIG. 1C is shown merely as an example, as clients 102, servers 106 and/or appliances 200 and 205 can be implemented by any computing or processing environment and with any type of machine or set of machines that can have suitable hardware and/or software capable of operating as described herein.

Processor(s) 103 can be implemented by one or more programmable processors executing one or more computer programs to perform the functions of the system. As used herein, the term "processor" describes an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" can be analog, digital or mixed-signal. In some embodiments, the "processor" can be one or more physical processors or one or more "virtual" (e.g., remotely located or "cloud") processors.

Communications interfaces 118 can include one or more interfaces to enable computer 101 to access a computer network such as a LAN, a WAN, or the Internet through a variety of wired and/or wireless or cellular connections.

In described embodiments, a first computing device 101 can execute an application on behalf of a user of a client computing device (e.g., a client 102), can execute a virtual machine, which provides an execution session within which applications execute on behalf of a user or a client computing device (e.g., a client 102), such as a hosted desktop session, can execute a terminal services session to provide a hosted desktop environment, or can provide access to a computing environment including one or more of: one or more applications, one or more desktop applications, and one or more desktop sessions in which one or more applications can execute.

Additional details of the implementation and operation of network environment 100, clients 102, servers 106, and appliances 200 and 205 can be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
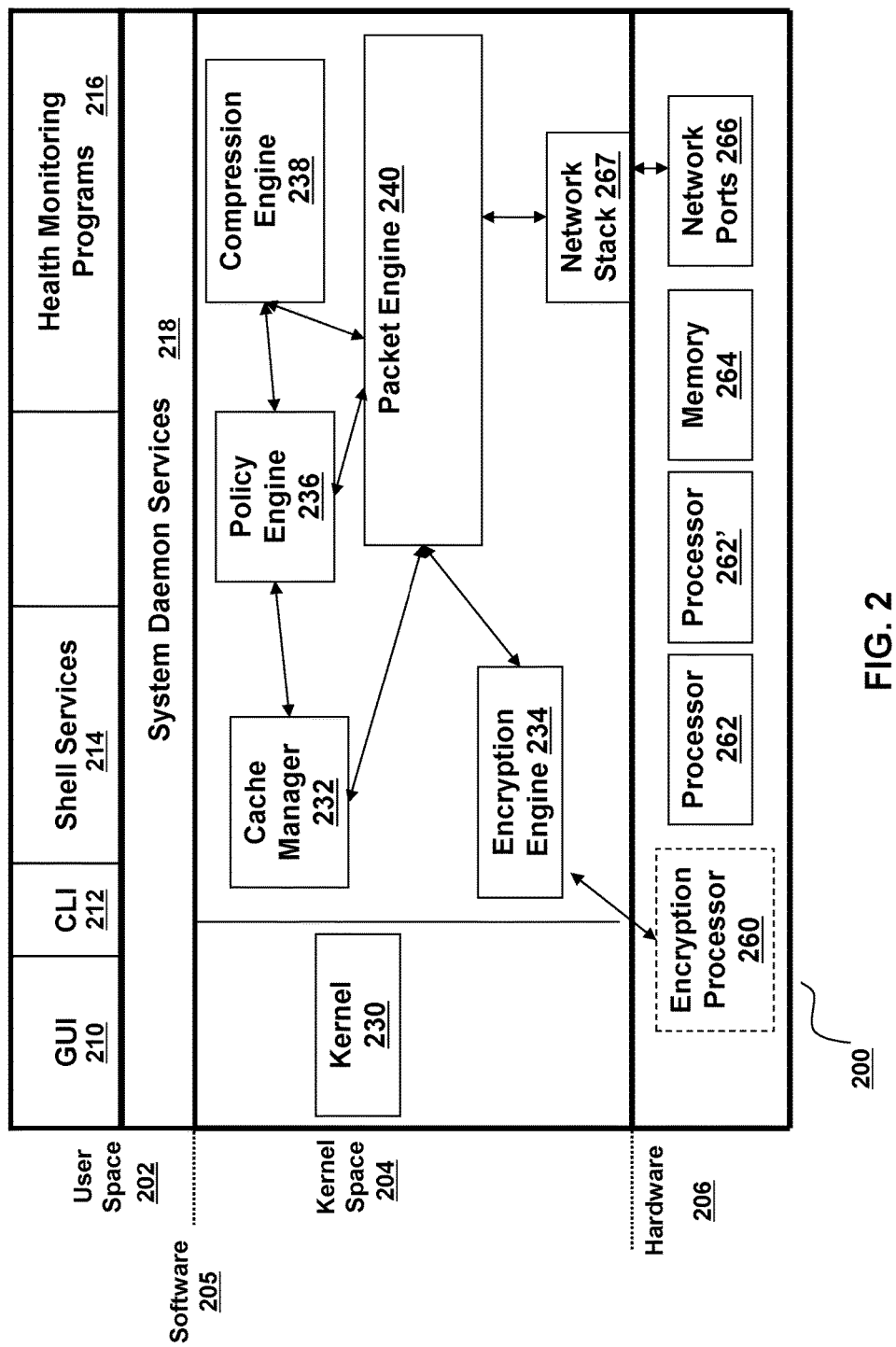
FIG. 2 is a block diagram of an appliance for processing communications between a client and a server, in accordance with an illustrative embodiment.

FIG. 2 shows an example embodiment of appliance 200. As described herein, appliance 200 can be implemented as a server, gateway, router, switch, bridge or other type of computing or network device. As shown in FIG. 2, an embodiment of appliance 200 can include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 can include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 can also include a number of network services or processes working in conjunction with cache manager 232.

Appliance 200 can include one or more network stacks 267, such as a TCP/IP based stack, for communicating with client(s) 102, server(s) 106, network(s) 104, and/or other appliances 200 or 205. For example, appliance 200 can establish and/or terminate one or more transport layer connections between clients 102 and servers 106. Each network stack 267 can include a buffer 243 for queuing one or more network packets for transmission by appliance 200.

Kernel space 204 can include cache manager 232, packet engine 240, encryption engine 234, policy engine 236 and compression engine 238. In other words, one or more of processes 232, 240, 234, 236 and 238 run in the core address space of the operating system of appliance 200, which can reduce the number of data transactions to and from the memory and/or context switches between kernel mode and user mode, for example since data obtained in kernel mode may not need to be passed or copied to a user process, thread or user level data structure.

Cache manager 232 can duplicate original data stored elsewhere or data previously computed, generated or transmitted to reducing the access time of the data. In some embodiments, the cache memory can be a data object in memory 264 of appliance 200, or can be a physical memory having a faster access time than memory 264.

Policy engine 236 can include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 can process any security related protocol, such as SSL or TLS. For example, encryption engine 234 can encrypt and decrypt network packets, or any portion thereof, communicated via appliance 200, can setup or establish SSL, TLS or other secure connections, for example between client 102, server 106, and/or other appliances 200 or 205. In some embodiments, encryption engine 234 can use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 can manage kernel-level processing of packets received and transmitted by appliance 200 via network stacks 267 to send and receive network packets via network ports 266. Packet engine 240 can operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 can include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 can interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 can determine if a program, process, service or task is active and currently running, check status, error or history logs provided by any program, process, service or task to determine any condition, status or error with any portion of appliance 200. Additionally, health monitor 216 can measure and monitor the performance of any application, program, process, service, task or thread executing on appliance 200.

Daemon services 218 are programs that run continuously or in the background and handle periodic service requests received by appliance 200. In some embodiments, a daemon service can forward the requests to other programs or processes, such as another daemon service 218 as appropriate.

As described herein, appliance 200 can relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 can translate or multiplex communications by modifying sequence numbers and acknowledgment numbers at the transport layer protocol level (e.g., "connection multiplexing"). Appliance 200 can also provide switching or load balancing for communications between the client 102 and server 106.

As described herein, each client 102 can include client agent 120 for establishing and exchanging communications with appliance 200 and/or server 106 via a network 104. Client 102 can have installed and/or execute one or more applications that are in communication with network 104. Client agent 120 can intercept network communications from a network stack used by the one or more applications. For example, client agent 120 can intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 can transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 can perform acceleration, streaming, monitoring, and/or other operations. For example, client agent 120 can accelerate streaming an application from a server 106 to a client 102. Client agent 120 can also perform end-point detection/scanning and collect end-point information about client 102 for appliance 200 and/or server 106. Appliance 200 and/or server 106 can use the collected information to determine and provide access, authentication and authorization control of the client's connection to network 104. For example, client agent 120 can identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 can be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 can include allocated virtual resources such as virtual processors 332 and/or virtual disks 342, as well as virtual resources such as virtual memory and virtual network interfaces. In some embodiments, at least one of VMs 306 can include a control operating system (e.g., 305) in communication with hypervisor 301 and used to execute applications for managing and configuring other VMs (e.g., guest operating systems 310) on device 302.

In general, hypervisor(s) 301 can provide virtual resources to an operating system of VMs 306 in any manner that simulates the operating system having access to a physical device. Thus, hypervisor(s) 301 can be used to emulate virtual hardware, partition physical hardware, virtualize physical hardware, and execute virtual machines that provide access to computing environments. In an illustrative embodiment, hypervisor(s) 301 can be implemented as a XEN hypervisor, for example as provided by the open source Xen.org community. In an illustrative embodiment, device 302 executing a hypervisor that creates a virtual machine platform on which guest operating systems can execute is referred to as a host server. In such an embodiment, device 302 can be implemented as a XEN server as provided by Citrix Systems, Inc., of Fort Lauderdale, Fla.

Hypervisor 301 can create one or more VMs 306 in which an operating system (e.g., control operating system 305 and/or guest operating system 310) executes. For example, the hypervisor 301 loads a virtual machine image to create VMs 306 to execute an operating system. Hypervisor 301 can present VMs 306 with an abstraction of hardware layer 307, and/or can control how physical capabilities of hardware layer 307 are presented to VMs 306. For example, hypervisor(s) 301 can manage a pool of resources distributed across multiple physical computing devices.

In some embodiments, one of VMs 306 (e.g., the VM executing control operating system 305) can manage and configure other of VMs 306, for example by managing the execution and/or termination of a VM and/or managing allocation of virtual resources to a VM. In various embodiments, VMs can communicate with hypervisor(s) 301 and/or other VMs via, for example, one or more Application Programming Interfaces (APIs), shared memory, and/or other techniques.

In general, VMs 306 can provide a user of device 302 with access to resources within virtualized computing environment 300, for example, one or more programs, applications, documents, files, desktop and/or computing environments, or other resources. In some embodiments, VMs 306 can be implemented as fully virtualized VMs that are not aware that they are virtual machines (e.g., a Hardware Virtual Machine or HVM). In other embodiments, the VM can be aware that it is a virtual machine, and/or the VM can be implemented as a paravirtualized (PV) VM.

Figure 3:
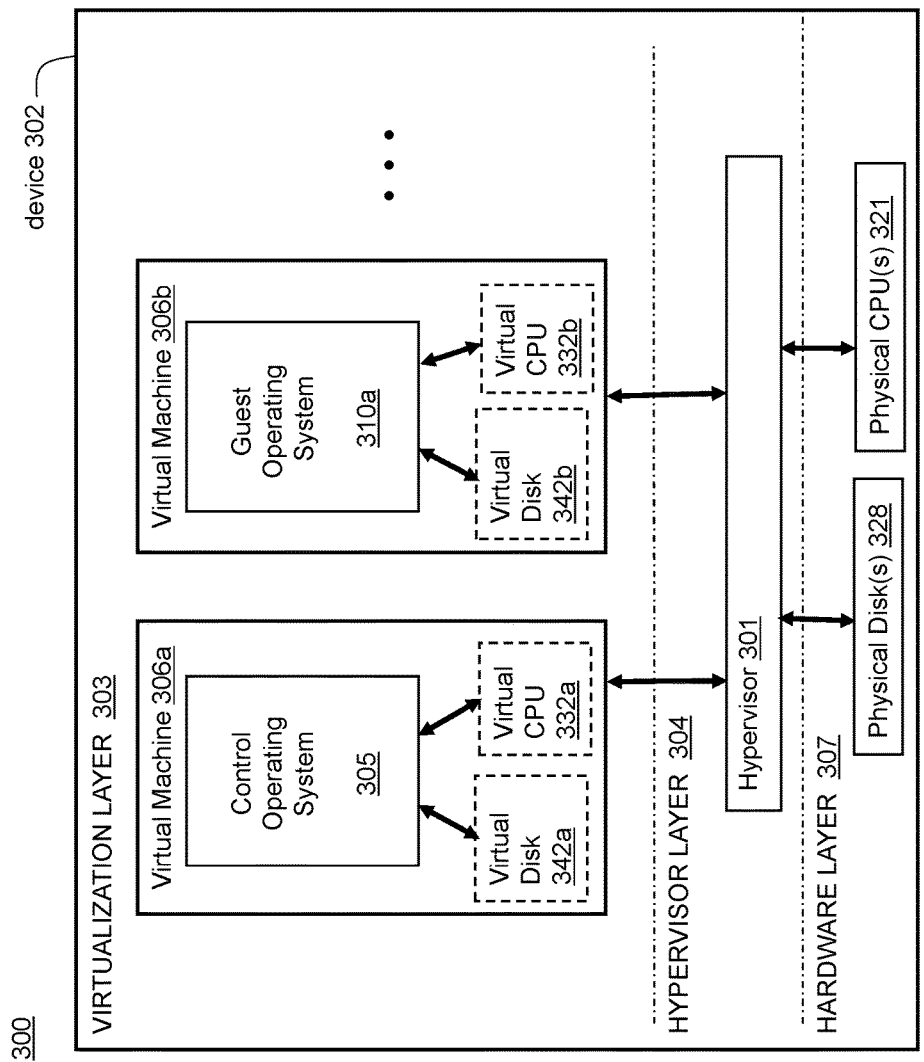
FIG. 3 is a block diagram of a virtualization environment, in accordance with an illustrative embodiment.

Although shown in FIG. 3 as including a single virtualized device 302, virtualized environment 300 can include a plurality of networked devices in a system in which at least one physical host executes a virtual machine. A device on which a VM executes can be referred to as a physical host and/or a host machine. For example, appliance 200 can be additionally or alternatively implemented in a virtualized environment 300 on any computing device, such as a client 102, server 106 or appliance 200. Virtual appliances can provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 can be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server can execute multiple virtual machines 306, for example on various cores of a multi-core processing system and/or various processors of a multiple processor device. For example, although generally shown herein as "processors" (e.g., in FIGS. 1C, 2 and 3), one or more of the processors can be implemented as either single- or multi-core processors to provide a multi-threaded, parallel architecture and/or multi-core architecture. Each processor and/or core can have or use memory that is allocated or assigned for private or local use that is only accessible by that processor/core, and/or can have or use memory that is public or shared and accessible by multiple processors/cores. Such architectures can allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality can be implemented in a virtualized environment (e.g., 300) on a client 102, server 106 or appliance 200, such that the functionality can be implemented across multiple devices, such as a cluster of computing devices, a server farm or network of computing devices, etc. The various processors/cores can interface or communicate with each other using a variety of interface techniques, such as core to core messaging, shared memory, kernel APIs, etc.

In embodiments employing multiple processors and/or multiple processor cores, described embodiments can distribute data packets among cores or processors, for example to balance the flows across the cores. For example, packet distribution can be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets can be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS can use a hashing scheme to determine a core or processor for processing a packet.

The RSS can generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof can be used to identify a processor, core, engine, etc., for distributing a network packet, for example via a hash table, indirection table, or other mapping technique.

Additional details of the implementation and operation of a multi-processor and/or multi-core system can be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Providing a Distributed Cluster Architecture

Figure 4:
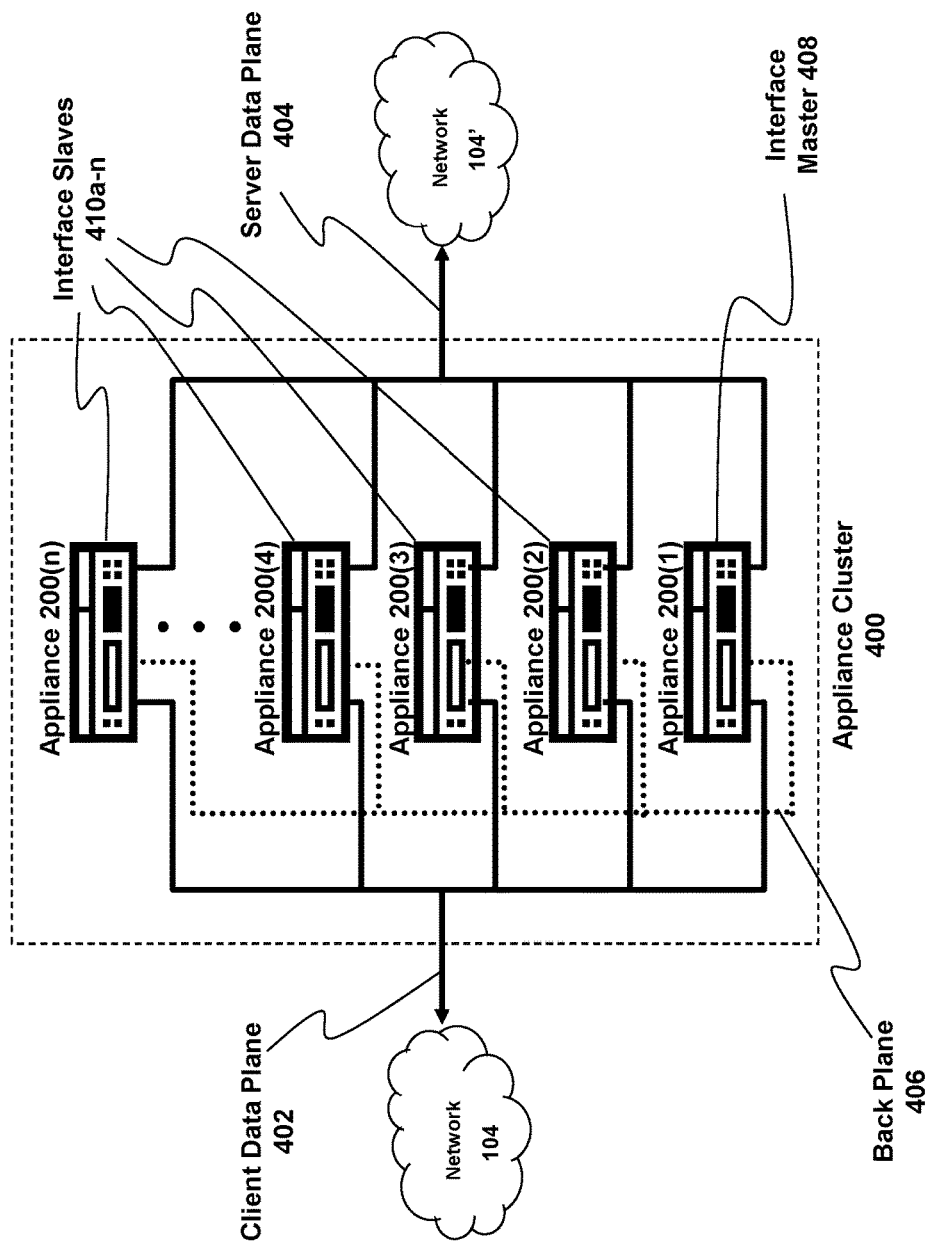
FIG. 4 is a block diagram of a cluster system, in accordance with an illustrative embodiment.

Although shown in FIGS. 1A and 1B as being single appliances, appliances 200 can be implemented as one or more distributed or clustered appliances. Individual computing devices or appliances can be referred to as nodes of the cluster. A centralized management system can perform load balancing, distribution, configuration, or other tasks to allow the nodes to operate in conjunction as a single computing system. Such a cluster can be viewed as a single virtual appliance or computing device. FIG. 4 shows a block diagram of an illustrative computing device cluster or appliance cluster 400. A plurality of appliances 200 or other computing devices (e.g., nodes) can be joined into a single cluster 400. Cluster 400 can operate as an application server, network storage server, backup service, or any other type of computing device to perform many of the functions of appliances 200 and/or 205.

In some embodiments, each appliance 200 of cluster 400 can be implemented as a multi-processor and/or multi-core appliance, as described herein. Such embodiments can employ a two-tier distribution system, with one appliance if the cluster distributing packets to nodes of the cluster, and each node distributing packets for processing to processors/cores of the node. In many embodiments, one or more of appliances 200 of cluster 400 can be physically grouped or geographically proximate to one another, such as a group of blade servers or rack mount devices in a given chassis, rack, and/or data center. In some embodiments, one or more of appliances 200 of cluster 400 can be geographically distributed, with appliances 200 not physically or geographically co-located. In such embodiments, geographically remote appliances can be joined by a dedicated network connection and/or VPN. In geographically distributed embodiments, load balancing can also account for communications latency between geographically remote appliances.

In some embodiments, cluster 400 can be considered a virtual appliance, grouped via common configuration, management, and purpose, rather than as a physical group. For example, an appliance cluster can comprise a plurality of virtual machines or processes executed by one or more servers.

As shown in FIG. 4, appliance cluster 400 can be coupled to a first network 104(1) via client data plane 402, for example to transfer data between clients 102 and appliance cluster 400. Client data plane 402 can be implemented a switch, hub, router, or other similar network device internal or external to cluster 400 to distribute traffic across the nodes of cluster 400. For example, traffic distribution can be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 can be coupled to a second network 104(2) via server data plane 404. Similarly to client data plane 402, server data plane 404 can be implemented as a switch, hub, router, or other network device that can be internal or external to cluster 400. In some embodiments, client data plane 402 and server data plane 404 can be merged or combined into a single device.

In some embodiments, each appliance 200 of cluster 400 can be connected via an internal communication network or backplane 406. Backplane 406 can enable inter-node or inter-appliance control and configuration messages, for inter-node forwarding of traffic, and/or for communicating configuration and control traffic from an administrator or user to cluster 400. In some embodiments, backplane 406 can be a physical network, a VPN or tunnel, or a combination thereof.

Additional details of cluster 400 can be as described in U.S. Pat. No. 9,538,345, issued Jan. 3, 2017 to Citrix Systems, Inc. of Fort Lauderdale, Fla., the teachings of which are hereby incorporated herein by reference.

E. Systems and Methods for Predicting Health of a Link

The present disclosure is directed to systems and methods for predicting health of a link. In a network, it can be challenging to identify links that are in a good state, identify the cause of a link entering a bad state, predict the future state of a link, or proactively prevent a link from entering a bad state. A device intermediary between a client and a server, such as a network appliance or a middlebox, can facilitate or improve load balancing of data transmission across links by utilizing links that are in a good state to transmit data. The device can determine the best link to send the high priority packets (traffic) by determining the packet loss, latency, jitter, congestion and other network entities from each of the links. For example, given a set of links between two middleboxes, network throughput or reliability can be improved by load balancing the data across good links that experience less packet drops, latency and jitter, as opposed to bad links. An active link (path) between the middleboxes can either be in a good state or a bad state based on the loss, latency, and jitter. The middlebox can be configured to choose a link or path that is in a good state as opposed to a link that is in a bad state (e.g., a link that experiences more packet loss, jitter and latency) to provide better QoS for the connections. Thus, maintaining more links in a good state can provide better quality of service (QoS) for the connections as it can provide the middlebox with more options from which to choose a link to send packets.

Factors that can cause a link to enter a bad state include, for example, high latency, high packet drop or high jitter. If the device can determine the cause of the link entering the bad state, the device can recover the link from that state. For example, if high jitter is the cause for a link from going bad, the device can remove the factors from the appliance end for that link that cause high jitter, thereby preventing the link from going to bad state.

Further, since the device selects good links to transport the packets reliably, the device can increase the load on good links. This can cause the good links to experience high jitter and loss and, eventually, enter a bad state. Systems and methods of the present disclosure can improve the use of the links by avoiding this cascading effect by predicting a cause of a link entering a bad state, and performing an action based on the cause to prevent the link from entering the bad state, such as redistributing traffic of certain connections. The intermediary device can prevent the best links from entering a bad state, and maintain a higher number of good quality links in the WAN.

Thus, systems and methods of the present disclosure allow a device to dynamically predict link health and take action based on the link health to prevent the link from going bad. Proactively managing link health or quality can prevent cascading effects of links going bad due to overloading. Further, the device can maintain a greater number of links in a good state.

To do so, the device can use predictive algorithms to detect a cause of a link entering a bad state or, a cause of a link entering a bad state in the future, and take actions based on the predicted cause to prevent the link from entering the bad state or recovering the link from the bad state. Thus, the device can maintain a high number of good quality links.

The device can identify, determine or predict the state (or health) of a link based on one or more parameters. The device can perform proactive connection management based on the parameters. For example, the device can be configured with a hybrid prediction mechanism that can include a set of static rules and an online machine learning classifier. The static rules can be empirically composed of link health defining parameters. The online machine learning classifier can learn over these parameters. The prediction output by the static rules and the prediction output by the online machine learning classifier can be weighted and combined to generate a final prediction that indicates whether a link is entering a bad state, as well as the cause of the link entering the bad state. The device can perform a proactive action or decision based on the cause in order to maintain the state or health of the link. The device can apply weights to the predictions that can be a function of time and accuracy of the respective tools.

To detect what causes a link to go to a bad state, the device can identify one or more variables or parameters, such as high packet drop, high jitter or high latency. The device can determine that the link can enter a bad state if any one or more of these parameters is greater than a threshold. The device can predict that a link would experience one or more of high packet drop, high jitter or high latency based on patterns and relationships. These patterns and relationships can be referred to as a feature set.

For example, an increase in packet drop can be determined from a combination of: increase in link utilization; increase in link latency; synchronization of window size; rate of increase of number of connections (burst); and type of connections (e.g., bulk, chatty, or stream). In another example, the increase in jitter can be determined by: difference in inter-arrival time in the queue, and the inter-arrival time to send the packets from the queue; average queue size; and current queue size. In yet another example, the increase in packet drop can be determined by: queue size; minimum latency; type of connection; and number of connections. The device can leverage the relationships across the various learning algorithms, by using prediction algorithms to predict what parameters can cause the link to fail (or enter a bad state) in the future.

A device (or appliance, WAN solution appliance, or intermediary device) can collect profile information or an online stream of traffic profile information. Static rules can predict the health of the link. For example:

$$C1*Loss+C2*Latency+C3*Jitter>T1 => \text{Bad link; or}$$

$$C4*Loss+C5*Latency+C6*Jitter>T2 => \text{Average Link,}$$

where C1, C2, C3, C4, C5, and C6 are weights; Loss, Latency and Jitter are parameters of the link; and T1 and T2 are thresholds.

In these example equations, even if one parameter, such as Loss, Latency or Jitter is too high, then the device determines or predicts that the link is or will be bad.

The system can also use an online machine learning classifier to determine or predict that the link is or will be bad. The machine learning classifier can use a training data set. For example, when the health of a link goes from good to bad due to loss, jitter, or latency, the timed sequence of parameters such as link utilization, latency, number of connections, queue size, etc., can be referred to as a single data point. The data set can include multiple rows of this data to reflect the time dependency or temporal nature of changes in the link health.

Initially, the pattern the classifier learns about different link state classes may be under fitted because the data set may be relatively small, and the classifier has a relatively few data points on which to rely to predict link health. Since the prediction generated by the classifier using relatively few data points may be different from the prediction generated by the static rules, the device can apply weights to the two predictions. The device can generate weight variables $W_{class}$ and $W_{rule}$. $W_{class}$ can be the weight corresponding to the classifier, and $W_{rule}$ can be the weight corresponding to the static rules. The device can use the weight variables break a tie between the predictions provided by the static rules and the classifier. The device can adjust the weights by increasing a weight for a technique if the corresponding prediction is correct (e.g., incentivize), or decreasing the weight if the prediction is wrong (e.g., penalize). The following pseudo-code illustrates an implementation of applying the weight function f(Pred, W):

```
If (WClass>WRule)
{
   FinalPrediction=PredClass;
}
else
{
   FinalPrediction=PredRule;
}
```

Having predicted the cause of the link going bad, the device can take preventive actions to prevent the link from entering a bad state. For example, if the predicted cause is high latency, the device can move connections with high packet occupancy in the queue to other links. In another example, if the predicted cause is high jitter, the device can move connections whose difference in inter-arrival time into the appliance and inter-departure time out of the queue is very high. In yet another example, if the predicted cause of the link going bad is high loss, the device can send only 90% of the bandwidth (e.g., for a 10 Mbps link, the device may transmit only 9 Mbps).

Figure 5A:
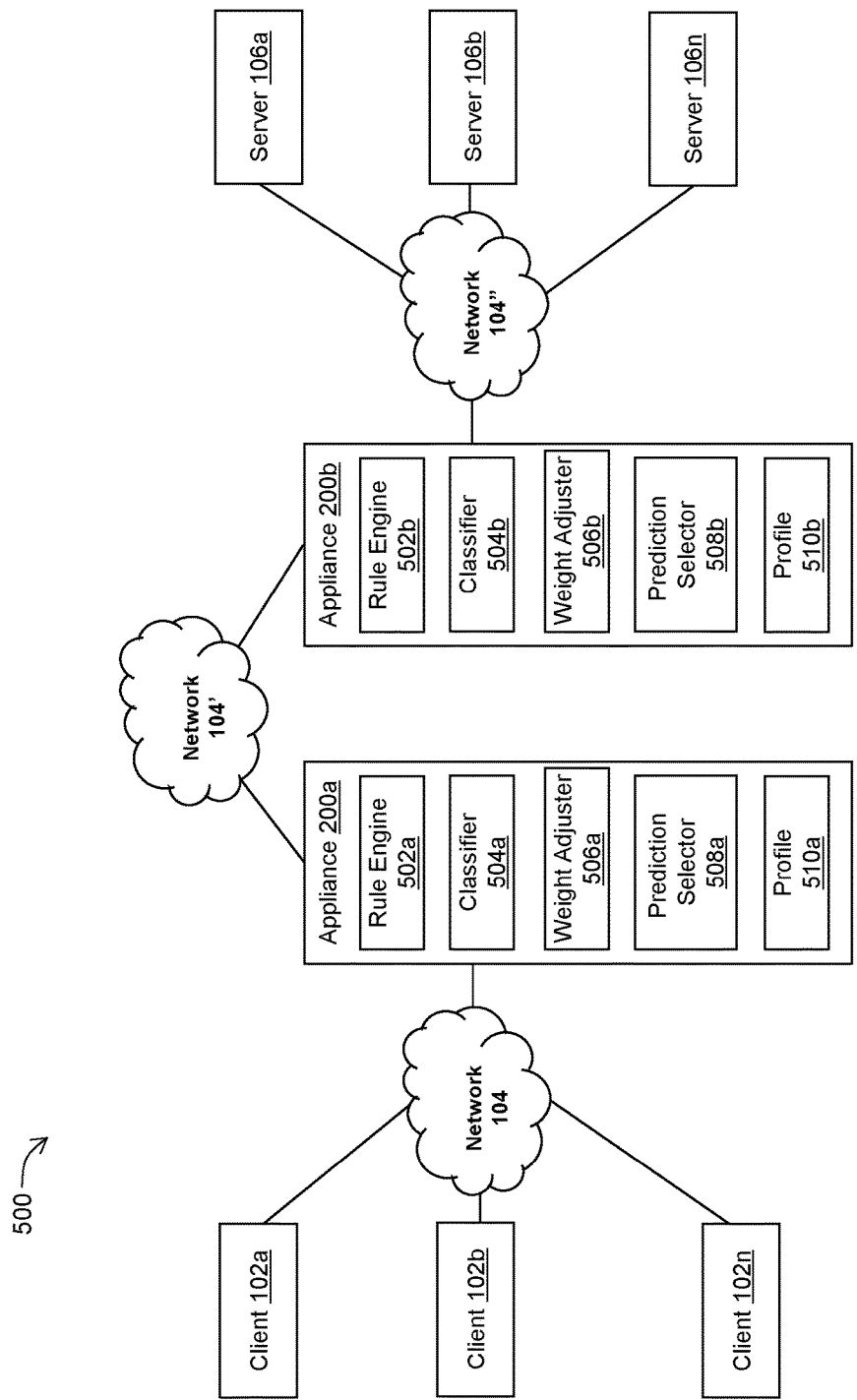
FIG. 5A is a block diagram of a system for predicting health of a link, in accordance with an illustrative embodiment.

Referring now to FIG. 5A, depicted is a block diagram of an embodiment of a system 500 for predicting health of a link. In brief summary, the system 500 can include a plurality of client devices 102a-n, one or more appliances 200a-n (e.g., a first appliance 200a and a second appliance 200b as shown), and a plurality of servers 106a-n. The client-side facing appliances 200a-n (e.g., the first appliance 200a) can be communicatively connected to the one or more clients 102a-n via network 104. The server-side appliances 200a-n (e.g., the second appliance 200b) can be communicatively connected to the one or more servers 106a-n via network 104". The client-side facing appliances 200a-n (e.g., the first appliance 200a) and the server-side facing appliances 200a-n (e.g., the second appliance 200b) can be communicatively connected to one another via network 104'. In some embodiments, there can be one or more communication links via the network 104' connecting the client-side facing appliances 200a-n (e.g., the first appliance 200a) and the server-side facing appliances 200a-n (e.g., the second appliance 200b). The networks 104 and 104" can be local area networks (LAN), whereas the network 104' can be a wide area network (WAN) for example.

Each appliance 200a-n can comprise features of any embodiment of the devices 200, described above in connection with at least FIGS. 1A-1C, 2, and 4. Each of the above-mentioned elements or entities is implemented in hardware, or a combination of hardware and software, in one or more embodiments. For instance, each of these elements or entities can include any application, program, library, script, task, service, process or any type and form of executable instructions executing on hardware of the device 200. The hardware includes circuitry such as one or more processors in one or more embodiments.

The systems and methods of the present solution can be implemented in any type and form of device, including clients, servers and appliances 200. As referenced herein, a "server" can sometimes refer to any device in a client-server relationship, e.g., an appliance 200 in a handshake with a client device 102a-n. The present systems and methods can be implemented in any intermediary device or gateway, such as any embodiments of the appliance or devices 200 described herein. Some portion of the present systems and methods can be implemented as part of a packet processing engine and/or virtual server of an appliance, for instance. The systems and methods can be implemented in any type and form of environment, including multi-core appliances, virtualized environments and/or clustered environments described herein.

The first appliance 200a can include a rule engine 502a, a classifier 504a, a weight adjuster 506a, a prediction selector 508a, and a profile 510a. The second appliance 200b also can include a rule engine 502b, a classifier 504b, a weight adjuster 506b, a prediction selector 508b, and a profile 510b. The rule engine 502a of the first appliance 200a can include similar functionalities as the rule engine 502b of the second appliance 200b. The classifier 504a of the first appliance 200a can include similar functionalities as the classifier 504b of the second appliance 200b. The weight adjuster 506a of the first appliance 200a can include similar functionalities as the weight adjuster 506b of the second appliance 200b. The prediction selector 508a of the first appliance 200a can include similar functionalities as the prediction selector 508b of the second appliance 200b. The profile 510a of the first appliance 200a can include similar data or functionalities as the profile 510b of the second appliance. For example, the profile 510a can be in synchronization with the profile 510b.

Each of the one or more appliances 200a-n can include one or more of at least one rule engine, at least one classifier, at least one weight adjuster, at least one prediction selector or at least one profile, with similar functionalities as the first appliance 200a and the second appliance 200b. The first appliance 200a can be referred to as a device or intermediary device.

The device (e.g., appliance 200a or appliance 200b) can be in communication with one or more links traversing network 104'. The links can be formed of one or more paths through network 104'. For example, network 104' can include a wide area network (WAN). A WAN can include a telecommunications network or computer network that extends over a geographical distance. The WAN can transmit data over relatively long distances, and between different local area networks, personal area networks, or metropolitan area networks, for example. In some cases, the WAN can be configured as a public network or a private network, such as for a particular organization.

The device can identify, obtain, retrieve, detector or otherwise obtain profile information of a stream of network traffic traversing a link in network 104'. The link can refer to or include a network path between two endpoints, nodes, a network tunnel, or a virtual private network tunnel. Network 104' can include diverse types of links, including, for example, one or more multiprotocol label switching links (MPLS), broadband links, and wireless links. For example, MPLS links can direct data from one network to the next based on short path labels. The labels can identify virtual links (paths) between distant nodes. MPLS can encapsulate packets of various network protocols.

The profile information can include one or parameters about the link, such as latency, utilization, loss of packets, jitter, queue size, number of connections, and type of connection. In some cases, the profile information can include two or more parameters about the link. Latency can refer to network latency and can refer to the amount of time it takes for a packet of data to get from one designated point to another. Latency can be measured by sending a packet that is returned to the sender, where the round-trip time is referred to as the latency. In some cases, the designated points can be appliance 200a and appliance 200b. For example, the appliance 200a can measure the time it takes for the packet to travel from appliance 200a to appliance 200b and back to appliance 200a via a link through network 104'. Latency can be measured in units of time, such as hours, minutes, seconds, microseconds, nanoseconds, or clock periods. A link can be labeled as having low latency or high latency based on a comparison of the latency with a predetermined latency threshold.

Utilization, or network utilization, can refer to the ratio of current network traffic over a link to the maximum traffic that the link can handle. The network utilization can be labeled as low, normal, or high based on a comparison with predetermined utilization thresholds. For example, a network utilization of 90% can indicate high utilization as compared to a network utilization of 20%. The appliance 200a can identify, detector or obtain the utilization of a link using a network utilization monitor. For example, the appliance 200a can be configured with or access a network monitor that collects network utilization metrics and statistics.

Loss of packets can refer to when one or more packets of data traveling across the link fail to reach the predetermined destination. Packet loss can be measured as a percentage of packets lost with respect to packets sent. The appliance 200a can detect or identify packet loss using the TCP protocol, which can detect packet loss over the link.

Jitter can refer to the variation in delay of received packets. The variation can be a statistical dispersion in the delay of the packets. For example, the sending side can transmit packets in a continuous, periodic stream where the packets are spaced apart evenly. However, due to network congestion, improper queuing, or configuration errors, the delay between packets can vary instead of remaining constant. In some cases, jitter can refer to the variation in latency as measured in the variability over time of the packet latency across a link in network 104'. For example, a link in network 104' with constant latency may have no variation (or jitter). Packet jitter can be expressed as an average of the deviation from the network mean latency or packet delay variation.

The queue size can refer to the amount of data maintained in a queue in the appliance 200a. The data can be maintained in a queue for a link prior to transmission over the link in network 104'. The size of the queue can be expressed in bytes, as a percentage of the original size of the data, or a proportion of the original size of the data to be sent over the link. In some embodiments, the data maintained in the queue can include data to be moved to the one or more links for transferring or processing between the one or more clients 102a-n and the one or more servers 106a-n. The one or more links for transferring or processing between the one or more clients 102a-n and the one or more servers 106a-n can be through two or more appliances 200a-n. In some embodiments, the one or more links for transferring or processing between the one or more clients 102a-n and the one or more servers 106a-n can be through the network 104' connecting the two or more appliances 200a-n.

The number of connections can refer to the number of connections over the link in network 104'. Types of connections can include, for example, MPLS, broadband, wireless, virtual private network tunnel, secure link, encrypted link, type of protocol, frame size, etc.

The appliance 200a can store the identified profile information in a data repository, database, data file, or data structure, such as in profile 510a, for further processing by one or more of appliance 200a or appliance 200b. The appliance 200a can store the profile information for each of the one or more links in network 104'. The appliance 200a can store the profile information in one or more data structures such that the profile information corresponds to a link and a time interval. The profile 510a can store historical profile information for the one or more links, or can reset the stored profile information responsive to a time interval (e.g., 1 hour, 6 hours, 24 hours, 48 hours, 72 hours, 1 week, 2 weeks, 30 days, etc.) or reset instruction.

The appliance 200a can include a rule engine 502a that can apply one or more rules to the parameters of the profile information for the link to predict, determine, detector or estimate a health, status or quality of the link. The rules can include static rules that can be applied to the one or more parameters about the link. The rule engine 502a can apply one or more rules to one or more parameters, two or more parameters, three or more parameters or all available parameters about the link. The rule engine 502a can select a rule from a plurality of rules based on the one or more parameters to which the rule engine 502a is to apply the rule.

The rule engine 502a can access a data repository, database or data file storing rules. The rule engine 502a can be configured with a function, script, or executable file that can apply a rule to one or more parameters. Applying the rule can include applying a weight, constant, or multiplier to one or more parameters, combining the one or more parameters, and comparing the combined one or more parameters with a threshold.

In some embodiments, the rule engine 502a can utilize a rule, equation or function configured such that even if one parameter is high, then the link becomes bad. The following are illustrative examples of rules the rule engine 502a can apply to one or more parameters to determine the health of a link and make a first prediction of the health of the link:

$$\text{Loss+Latency+Jitter}>T_1 => \text{Bad link} \qquad \text{Rule 1:}$$

$$C1*\text{Loss}+C2*\text{Latency}+C3*\text{Jitter}>T_1 => \text{Bad link} \qquad \text{Rule 2:}$$

$$\text{Loss+Latency+Jitter}<T_2 => \text{Good link} \qquad \text{Rule 3:}$$

$$C4*\text{Loss}+C5*\text{Latency}+C6*\text{Jitter}>T_2 => \text{Average link} \qquad \text{Rule 4:}$$

In the example Rule 1, the rule engine 502a combines the following parameters Loss, Latency, and Jitter for the link by summing the parameters, and predicts that the health of the link is bad responsive to the sum of the parameters being greater than the threshold T1.

The rule engine 502a can combine the parameters by summing or adding the parameters. The rule engine 502a can combine the parameters by multiplying the parameters. The rule engine 502a can combine the parameters by taking a dot product of the parameters. The rule engine 520a can combine the parameters using one or more operations, such as addition, subtraction, multiplication or division. Combining the parameters can include or refer to combining values for the parameters. For example, the value for the parameter Loss can be a percentage of packets lost with respect to packets sent (e.g., 1%, 2%, 3%, 5%, etc.), and the value for the parameter latency can be a unit of time (e.g., 1 millisecond, 2 milliseconds, 3 milliseconds, 4 milliseconds, etc.).

The rule engine 502a can compare the combination of the parameters (e.g., the sum of the parameters) with a threshold. The rule engine 502a can predict the health of the link based on the comparison of the combination of the parameters with the threshold. The rule engine 502a can identify, retrieve, receive or otherwise obtain the threshold from a data repository, database, data file or data structure stored in memory on the appliance 200a or otherwise accessible to the rule engine 502a. The thresholds can be predetermined. The thresholds can be determined based on an analysis of historical link performance.

For example, the rule engine 502a can retrieve a threshold T1 from memory. The rule engine 502a can compare the combination of the parameters with the threshold T1 to determine that the combination of the parameters is greater than T1, equal to T1, or less than T1. If the combination of the parameters is greater than T1, the rule engine 502a can determine or predict that the health of the link is bad, or that the link is a bad link.

In the example Rule 2, the rule engine 502a combines or applies a multiplier, weight, or constant to each of the parameters. The rule engine 520a compares the combined and weighted parameters with threshold T1 to determine that the combined and weighted parameters is greater than the threshold T1. Responsive to determining that the combined and weighted parameters is greater than threshold T1, the rule engine 502a determines or predicts that the health of the link is bad.

For example, the rule engine 502a can apply a multiplier or weight of C1 to the Loss parameter; a multiplier or weight of C2 to the parameter Latency; and a multiplier or weight of C3 to the parameter of Jitter. The values for the multipliers C1, C2, C3 can be different or the same. The values for the multipliers C1, C2 and C3 can be predetermined. The values for the multipliers C1, C2, and C3 can be configured to allow the rule engine 502a to combine the parameters such that the rule engine 502a can properly compare the combination with the threshold. For example, the multipliers C1, C2 and C3 can be selected or predetermined to normalize the values for the one or more parameters, such as Loss, Latency and Jitter. The rule engine 502a can combine the weights C1, C2 and C3 with the corresponding one or more parameters via one or more operations, such as multiplication, dot product, division, addition, or subtraction.

In the example Rule 3, the rule engine 502a combines each of the parameters Loss, Latency and Jitter. The rule engine 520a compares the combined parameters with threshold $T_2$ to determine that the combination of the parameters is less than the threshold $T_2$. For example, the rule engine 502a can combine the parameters via one or more operations, such as multiplication, dot product, division, addition, or subtraction. Responsive to determining that the combination of the parameters is less than threshold $T_2$, the rule engine 502a determines or predicts that the health of the link is good. The rule engine 502a can flag the link as having a good health, assign a label to the link, associate the link with a good state in a data structure, or otherwise indicate or store, in a data file memory, the health of the link.

In the example Rule 4, the rule engine 502a combines or applies a multiplier, weight, or constant to each of the parameters. The rule engine 520a compares the combined and weighted parameters with threshold T2 to determine that the combined and weighted parameters is greater than the threshold T2. Responsive to determining that the combined and weighted parameters is greater than threshold T2, the rule engine 502a determines or predicts that the health of the link is average. The rule engine 502a can flag the link as having average health, assign a label to the link, associate the link with a good state in a data structure, or otherwise indicate or store, in a data file memory, the health of the link.

For example, the rule engine 502a can apply a multiplier or weight of C4 to the Loss parameter; a multiplier or weight of C5 to the parameter Latency; and a multiplier or weight of C6 to the parameter of Jitter. The values for the multipliers C4, C5, and C6 can be different or the same. The values for the multipliers C4, C5, and C6 can be predetermined. The values for the multipliers C4, C5, and C6 can be configured to allow the rule engine 502a to combine the parameters such that the rule engine 502a can properly compare the combination with the threshold. For example, the multipliers C4, C5, and C6 can be selected or predetermined to normalize the values for the one or more parameters, such as Loss, Latency and Jitter. The rule engine 502a can combine the weights C4, C5, and C6 with the corresponding one or more parameters via one or more operations, such as multiplication, dot product, division, addition, or subtraction.

The thresholds T1 and T2 can be dynamically set or determined based on any number of factors, such as a number of links, number of ports, bandwidth, historical values, information about the one or more clients 102a-n, the one or more servers 106a-n, or other appliances 200b-n, computing resources on the appliance 200a (e.g., processor usage, processing time, memory usage, power consumption, etc.), and/or network resources (e.g., bandwidth, latency, throughput, and other parameters resources at the networks 104, 104', and 104"), priority of traffic, type of packets, etc.

The appliance 200a can include a classifier 504a. The classifier 504a can determine a second prediction of health of the link by applying a classifier to one or more timed sequences of the plurality of parameters of the profile information. The rule engine 502a can make a first prediction of the health of the link using a first technique, and the classifier 504a can make a second prediction of the link using a second technique. For example, the rule engine 502a can make a first prediction of the health of the link using one or more static rules, and the classifier 504a can make a second prediction of the link using a machine learning technique.

The classifier 504a can obtain one or more timed sequences of the parameters about the link. In some cases, the appliance 200a can create the one or more timed sequences of the plurality of parameters. For example, the appliance 200a can monitor track the health of the link based on one or more parameters. As the combination of the one or more parameters goes above or below a predetermined threshold, the classifier 504a can determine that the health of the link is good, bad, or average. For example, responsive to the health of the link one of climbing above or falling below a predetermined threshold, the classifier 504a can create the one or more timed sequences of the parameters about the link. The timed sequence of parameters can include parameters such as link utilization, link latency, number of connections, synchronized TCP connections, queue size, etc. When the link goes from good to bad, the appliance 200a can assign or determine a class that indicates a parameter that led to the link going from good to bad, such as high loss, high jitter, or high loss and high jitter. The appliance 200a can determine the cause as being high loss based on a value for the loss parameter being greater than a predetermined loss threshold. The appliance can determine the cause of the link being bad based on the value of the jitter parameter being greater than a predetermined jitter threshold.

The classifier 504a can be configured with machine learning classification technique to determine or predict the health of the link, such as whether the link is or will be bad. The classifier 504a can identify to which of a set of classes, categories (or sub-populations) a new set of one or more observed parameters belongs, on the basis of a training set of data containing observations (or instances) whose category membership is known. For example, the training set of data can include timed sequences of parameters that correspond to when the health of a link goes from good to bad due to loss, jitter, or latency, the timed sequence of parameters such as link utilization, latency, number of connections, queue size, etc., can be referred to as a single data point. The data set can include multiple rows of this data to reflect the time dependency or temporal nature of changes in the link health. In this example, the class, category or subpopulation can be high loss, high jitter, or high jitter and loss. The observed parameters can be classified as high loss, for example, based on the parameters corresponding to an amount of packet loss that is greater than a predetermined threshold.

| Time | Link Utilization | Link Latency | Number of connections | Synchronized TCP Connection | Queue Size | ... | Class |
|---|---|---|---|---|---|---|---|
| 1 | A1 | B1 | D1 | E1 | F1 | | High loss |
| 2 | A2 | B2 | D2 | E2 | F2 | | High jitter |
| 3 | A3 | B3 | D3 | E3 | F3 | | High loss and jitter |
| ...d | Ad | Bd | Dd | Ed | Fd | | |

In the first data point corresponding to the timed sequence in the row in Table 1 at time 1, the parameter link utilization has a value of A1, the parameter link latency has a value of B1, the parameter number of connections has a value of D1, the parameter synchronized TCP connection has a value of E1 and the parameter queue size has a value of F1. At time 1, the values A1, B1, D1, E1 and F1 can correspond to a classification or category of "high loss". The classifier 504a, or other monitor of appliance 200a, can determine that at time 1, the performance of the link was such that there was a high amount of data packet loss based on the amount of data loss being greater than a predetermined loss threshold. The appliance 200a can create an entry in the training set that indicates the values of the parameters and the corresponding class.

In the second data point corresponding to the timed sequence in the row in Table 1 at time 2, the parameter link utilization has a value of A2, the parameter link latency has a value of B2, the parameter number of connections has a value of D2, the parameter synchronized TCP connection has a value of E2 and the parameter queue size has a value of F2. At time 2, the values A2, B2, D2, E2 and F2 can correspond to a classification or category of "high jitter". The classifier 504a, or other monitor of appliance 200a, can determine that at time 2, the performance of the link was such that there was a high amount of variance between the times at which packets are received at a destination as compared to a periodic time interval at which the data packets are transmitted on the link, where the variance is greater than a predetermined jitter threshold. The appliance 200a can create an entry in the training set that indicates the values of the parameters and the corresponding class.

In the third data point corresponding to the timed sequence in the row in Table 1 at time 3, the parameter link utilization has a value of A3, the parameter link latency has a value of B3, the parameter number of connections has a value of D3, the parameter synchronized TCP connection has a value of E3 and the parameter queue size has a value of F3. At time 3, the values A3, B3, D3, E3 and F3 can correspond to a classification or category of "high loss and high jitter". The classifier 504a, or other monitor of appliance 200a, can determine that at time 3, the performance of the link was such that there was a high amount packet loss in addition to a high amount of variance between the times at which packets are received at a destination as compared to a periodic time interval at which the data packets are transmitted on the link, where the packet loss is greater than a predetermined loss threshold and where the variance is greater than a predetermined jitter threshold. The appliance 200a can create an entry in the training set that indicates the values of the parameters and the corresponding class.

The classifier 504a, via a machine learning technique, can use the classifications in the training set as instances of supervised learning, e.g., learning where a training set of correctly identified observations is available. The parameters in the training set can be referred to as explanatory variables or features. The classifier 504a can then perform a corresponding unsupervised procedure, such as clustering, to group data into classes or categories based on a measure of similarity or distance between a new set of observed parameters with the training set. For example, the classifier 504a can be configured with a mathematical function or classification algorithm that maps input parameter data to a category or class.

Example classification techniques can include regressions, logistic regressions, Bayesian procedures, neural networks, linear functions, Long Short Term Memory (LSTM) Recurrent Neural Network (RNN) classifier, etc. For example, the classifier 504a can perform a logistic regression where the observed parameters are termed explanatory variables and the classes or categories to be predicted are outcomes, which are considered to be possible values of the dependent variable. The classifier 504a can use a machine learning in which the observed parameters can be instances, the explanatory variables can be features (grouped into a feature vector), and the possible categories to be predicted are classes.

In some embodiments, the classifier 504a includes, is configured with, or otherwise accesses an LSTM Recurrent neural network classifier that can learn the stream of timed sequences of data points of the training set illustrated in Table 1. The classifier 504a, configured with Long short-term memory, can use an artificial neural network architecture that supports machine learning. The classifier 504a can be recurrent (RNN), allowing data to flow both forwards and backwards within the network. The classifier 504a can interface, access, or utilize additional network units. The classifier 504a can use the LSTM RNN to learn from the training set to classify, process and predict time series given time lags of unknown size and bound between important events. The classifier 504a can, during a training or re-training process, establish weights for the parameters or the classes.

Thus, the classifier 504a can provide a second prediction for the health of the link using a technique that is different from the technique used by the rule engine 502a to provide the first prediction of the health of the link. The appliance 200a can then analyze, process, or compare the first prediction with the second prediction. The appliance 200a can process the first and second predictions. The appliance 200a can manipulate or modify the first and second predictions prior to selecting the predictions or combining the predictions.

For example, the appliance can include a weight adjuster 506a. The weight adjusted 506a can establish a respective weight for each of the first prediction of health and the second prediction of heath. The weight adjuster 506a may determine weights to apply to the first prediction and the second prediction. The weight adjuster 506a can determine and apply weights to the predictions based on the techniques used to make the predictions. For example, the weight adjuster 506a can apply a first weight to the first predictions based on the first predictions being made by the rule engine 502a; and apply a second weight to the second prediction based on the second prediction being made by the classifier 504a. The weight adjuster 504a may determine a weight for the second prediction made by the classifier 504a based on the amount or size of the training set or historical data points available to the classifier 504a. For example, the pattern learnt by classifier 504a about different link state classes may be under fitted in an initial or early phase because the classifier 504a may have access to only a few data points. Accordingly, the appliance 200a can be configured to not overly rely on the prediction made by the classifier 504a.

The weight adjuster 506a, therefore, can establish or define a weight variable $W_{class}$ for the weight to apply to the prediction made by the classifier, and a weight variable $W_{rule}$ to apply to the prediction made by the rule engine 502a. These weight variables can allow the appliance 200a to select a prediction.

The weight adjuster 506a can adjust the weights by increasing a weight for a technique if the corresponding prediction is correct (e.g., incentivize), or decreasing the weight if the prediction is wrong (e.g., penalize). Weights can be predetermined or determined based on a function. The weight can be based on the number of data points to which the classifier 504a has access. The weights can be determined based on a comparison of the predictions. For example, each time the prediction output by the classifier 504a matches or corresponds to the prediction made by the rule engine 502a, the weight $W_{Class}$ can be increased. For example, the weight $W_{Class}$ can be incremented by a number (e.g., incremented by 1, 2, 3, 4, 5, etc.) responsive to the prediction output by the classifier 504a matching the prediction output by the rule engine 502a. However, if the prediction output by the classifier 504a does not match the prediction output by the rule engine 502a, the weight adjuster 506a and decrement $W_{class}$ by a number (e.g., 1, 2, 3, 4, 5, etc.). The weight adjuster 506a can increment or decrement the weight by the same amount or different amounts. For example, the weight adjuster 506a can provide a greater incentive relative to penalty by using a number for the increment that is greater than the decrement.

The weight adjuster 506a can use other techniques or factors to assign weights $W_{class}$ and $W_{rule}$. For example, the weight $W_{class}$ can be based on the number of data points in the training set (e.g., the weight can be 3 based on the 3 data points shown in the training set illustrated in Table 1). The $W_{rule}$ can be set a fixed value, such as 2, 3, 4, 5 etc.

The appliance 200a can use the weights to select or determine a final prediction of health of the link. The appliance 200a can include a prediction selector 508a that selects, using the respective weights $W_{class}$ and $W_{rule}$, between the first prediction of health and the second prediction of health to provide a predictor of the health of the link. The following pseudocode illustrates an implementation of applying the weight function f(Pred, W):

If ($W_{Class} > W_{Rule}$)
{
   FinalPrediction=PredClass;
}
else
{
   FinalPrediction=PredRule;
}

In the illustrated pseudo code, FinalPrediction can refer to the final prediction selected by the prediction selector 508a; PredClass can refer to the prediction outcome made by the classifier 504a; and PredRule can refer to the prediction outcome made by the rule engine 502a. As illustrated in the pseudocode, the prediction selector 508a can compare the $W_{Class}$ with $W_{Rule}$. If $W_{Class}$ is greater than $W_{Rule}$, the prediction selector 508a can set the final prediction as the prediction output by the classifier 504a. If, however, $W_{Class}$ is less than or equal to $W_{Rule}$, the prediction selector 508a can set the final prediction as the prediction output by the rule engine 502a. In some cases, $W_{Rule}$ can be referred to as a first weight and be applied to the first prediction made by the rule engine 502a; and $W_{class}$ can be referred to as a second weight and be applied to the second prediction made by the classifier 504a.

The appliance 200a (e.g., prediction selector 508a) can be configured to take a preventive action. For example, having predicted the cause of the link going bad, the appliance 200a can take preventive actions to prevent the link from entering a bad state. For example, if the FinalPred is high latency, the appliance 200a can move connections with high packet occupancy in the queue to other links. In another example, if the FinalPred is high jitter, the appliance 200a can move connections whose difference in inter-arrival time into the appliance and inter-departure time out of the queue is very high. In yet another example, if the FinalPred of the link going bad is high loss, the appliance 200a can send only 90% of the bandwidth (e.g., for a 10 Mbps link, the appliance 200a may transmit only 9 Mbps). In yet another example, if the FinalPred is high loss and high jitter, the appliance 200a can both move connections whose difference in inter-arrival time into the appliance and inter-departure time out of the queue is very high and send only 90% of the bandwidth of the link.

Thus, the appliance 200a can be configured to take an action associated with the link responsive to the predictor of the health of the link that is selected from predictions made by a rule engine and classifier based on weights. For example, the appliance 200a can identify via the selected predictor of the health of the link, that the link has high latency based on a predetermined latency threshold. The appliance 200a can, responsive to the prediction that the link has high latency, move one or more connections with packet occupancy greater than a predetermined occupancy threshold in a queue to one or more other links. In another example, the appliance 200a can identify via the selected predictor of the health of the link, that the link has high jitter based on a predetermined jitter threshold. Responsive to predicting that the health of the link corresponds to high jitter, the appliance 200a can move one or more connections with a difference in inter-arrival time into the appliance 200a and inter-departure time of a queue of the appliance 200a that is above a predetermined threshold. In yet another example, the appliance 200a can identify via the selected predictor of the health of the link, that the link has high loss based on a predetermined loss threshold and transmit by the device a predetermined portion of bandwidth via the link.

Figure 5B:
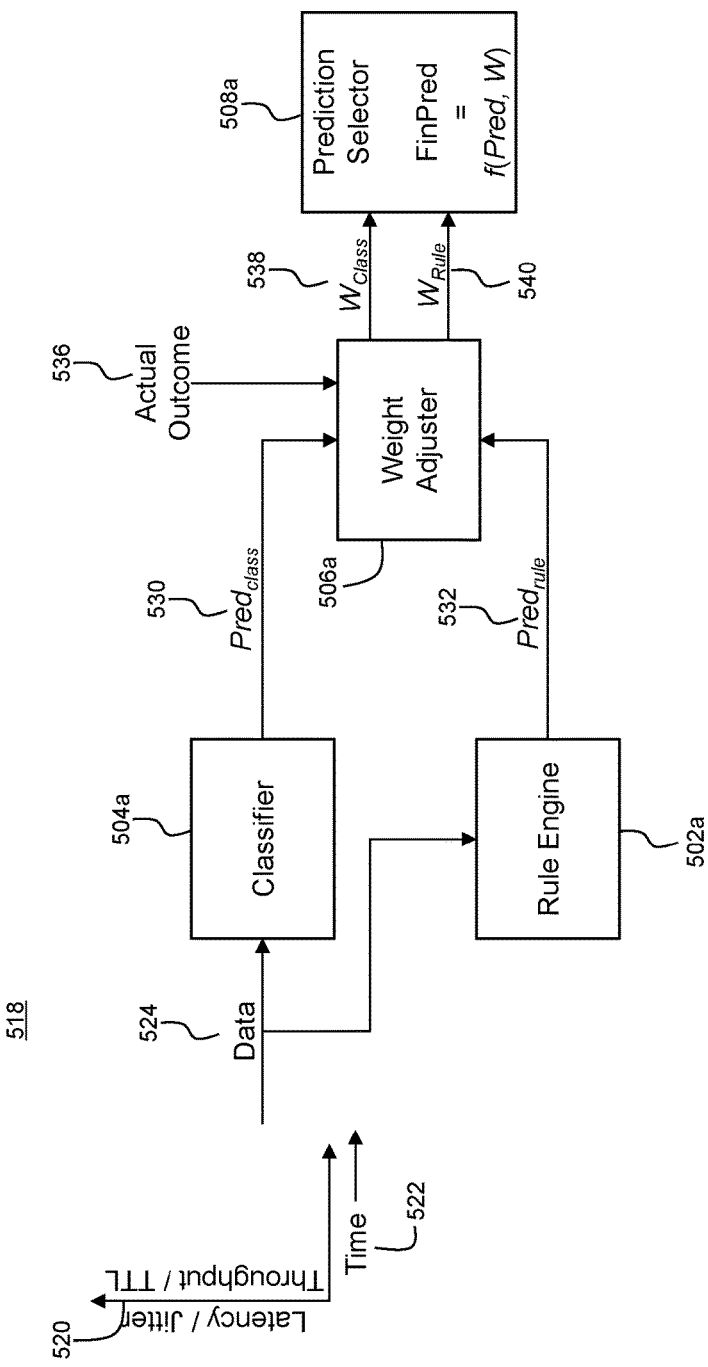
FIG. 5B is a block diagram of a sequence of operations for predicting health of a link, in accordance with an illustrative embodiment.

Referring now to FIG. 5B, depicted is a block diagram of a sequence of operations for predicting health of a link. The operation 518 can be performed by one or more system or component depicted in FIG. 5A, including, for example, the rule engine 502a, classifier 504a, weight adjuster 506a, and prediction selector 508a. The operation of the system 518 progresses based on time 522 to monitor the health of the link 520, where the health can be latency, jitter, throughput, or time-to-live (TTL) of a packet of the link. The TTL can be a value in the internet protocol that can indicate the amount of time a packet has been in the link. Over the time 522, data 524 data 524 can be provided as input to the classifier 504a. Data 524 can also be input to the rule engine 502a. The data 524 can include, for example, profile information about a link, such as parameters, values for parameters, a training set or current parameters. Same or different data 524 can be provided to the classifier 504a as compared to the rule engine 502a. In some cases, the data can be pre-processed or filtered differently for the rule engine 502a as compared to the classifier 504a.

The classifier 504a can output a predictor of the health of the link $Pred_{class}$ 530 using the data 524. The rule engine 502a can output a predictor of the health of the link $Pred_{rule}$ 532 using the data 524. The classifier 504a can provide the $Pred_{class}$ 530 to the weight adjuster 506a. The rule engine 502a can provide the $Pred_{rule}$ 532 to the weight adjuster 506a. The weight adjuster 506a can identify weights for the $Pred_{class}$ 530 and $Pred_{rule}$ 532. For example, the weight adjuster 506a can identify $W_{Class}$ 538 for the $Pred_{Class}$ 530 and $W_{Rule}$ 540 for $Pred_{rule}$ 532. In some cases, the weight adjuster 506a can increment or decrement the weights. The weight adjuster can increment or decrement the weights based on an actual outcome 536. For example, during a supervised learning process, the weight adjuster 506a can receive actual outcomes 536 of the health of the link, compare the actual outcome 536 with the predicted outcomes received from the rule engine and classifier, and then assign or adjust weights based on the comparison. For example, if the classifier 504a provides a prediction that matches the actual outcome 536, the weight adjuster 506a can increment the weight for the classifier. If the rule engine provides a prediction that matches the actual outcome 536, the weight adjuster can increment the weight for the rule engine. If the classifier 504a provides a prediction that does not match the actual outcome 536, the weight adjuster 506a can decrement the weight for the classifier. If the rule engine provides a prediction that does not match the actual outcome 536, the weight adjuster can decrement the weight for the rule engine. In some cases, the actual outcome 536 can refer to an outcome received via data 524 at a point in time subsequent to when the prediction for the health of the link was made. For example, the system 500 can provide a prediction of a future health the link, and then the system 500 can receive the actual health of the link and compare the actual health with the prediction to determine the accuracy of the prediction.

The weight adjuster 506a can provide the $W_{class}$ 538 and $W_{Rule}$ 540 to the prediction selector 508a. The prediction selector 508a can execute a function f(Pred, W) that takes, as input, the $Pred_{class}$ 530 and $Pred_{rule}$ 532 and $W_{class}$ 538 and WRule 540 to select a final prediction. The final prediction can be one of the $Pred_{class}$ 530 and $Pred_{Rule}$ 532 based on the respective weights $W_{class}$ 538 and $W_{Rule}$ 540.

Figure 5C:
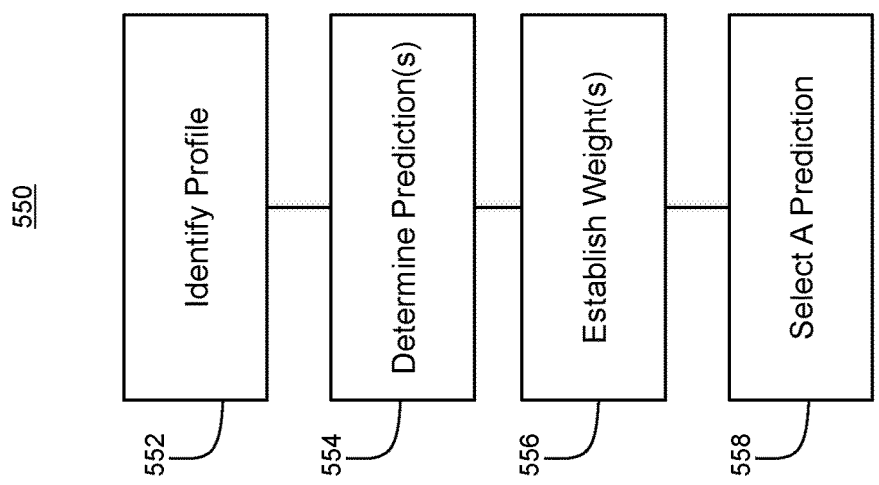
FIG. 5C is a flow diagram of method of predicting health of a link, in accordance with an illustrative embodiment.

Referring now to FIG. 5C, a flow diagram of a method of predicting health of a link in accordance with an embodiment is shown. The operations and functionalities of method 550 can be implemented using the system 500 described above. In brief overview, a device (e.g., appliance 200a or appliance 200b) intermediary between a client and a server can identify a profile at block 552. At block 554, the device can determine one or more predictions. At block 556, the device can establish weights. At block 556, the device can select a prediction.

In further detail, referring to block 552, and in some embodiments, the device intermediary between a client and a server can identify profile information. The device can be in communication with one or more links in a network. The profile information can include data about a link in a network. The profile information can include current data indicative of the health of the link. The profile information can be about a stream of network traffic traversing the link. The profile information can include a plurality of parameters about the link. The profile information can include a training set, historical data, configuration information, or instructions. In some cases, the profile information can include rules or classification techniques, or thresholds that can be used to determine or predict the health of the link.

The device can receive the profile information or other data via a network. The device can receive the profile information or other data via a data file, input/output port, server or client. The device, in some cases, can retrieve the profile information from a data file stored in memory of the device.

At block 554, the device can determine predictions. The device can determine predictions about the health of the link or a state of the link. The prediction can be about a current health of the link, or a future health of the link. The device can determine multiple predictions using multipole techniques. For example, the device can determine a first prediction of the health of the link using a first technique, and determine a second prediction of the health of the link using a second technique. The device can be configured to determine both predictions using the same or different input profile information. The device can be configured to determine the first prediction and the second prediction at the same time, simultaneously, in an overlapping manner, or serially. The device can determine the first prediction using a static rule-based technique, and determine the second prediction using an online machine learning classifier based technique, for example. The device can determine a second prediction of health of the link by applying a classifier to one or more timed sequences of the plurality of parameters of the profile information.

In some cases, the device can determine to make only a single prediction using a single technique. For example, the device can determine, based on weights associated with the different prediction techniques, that the weight for a prediction technique is greater than a threshold. Responsive to determining that a weight for a technique is greater than a threshold, the device can determine to apply only the single prediction technique corresponding to the weight greater than the threshold. In some cases, the device can determine to utilize multiple prediction techniques responsive to the weight being less than a threshold.

At block 556, the device can establish one or more weights. The device can establish a respective weight for each of the first prediction of health and the second prediction of heath. The weight can indicate a degree of confidence in the respective prediction techniques. The weight can be predetermined, or dynamically determined. The device can adjust or modify the weight over time. For example, the device can increase the weight for a prediction technique responsive to determining that the prediction technique performed in a satisfactory manner, such as output a prediction that matches a desired prediction outcome. The weight can be set based on a similarity of prediction outcomes to a training set, or based on a supervised learning process.

At block 558, the device can select a prediction to make a final prediction. The device can select, using the respective weight, between the first prediction of health and the second prediction of health to provide the final predictor of the health of the link. The device can compare the weights of the predictors to determine which prediction to select. The weights can correspond to the different prediction techniques.

The device can take or perform actions based on the final prediction of the health of the link. The device can proactively load balance across links based on the prediction of the health of the link. For example, if there are multiple available links via which traffic can be transmitted, the device can move traffic from a link corresponding to a bad state to a different link that is in a good state. In another example, the device can proactively reduce a maximum available bandwidth of the link to 90%, for example, responsive to the prediction of the health of the link. For example, if the predicted cause of the link going bad is high loss, the device can send only 90% of the bandwidth (e.g., for a 10 Mbps link, the device may transmit only 9 Mbps). Thus, the device can proactively link load balance to improve the overall performance of the network, increase reliability, and reduce wasted resources and network delays. Furthermore, improving the performance of the network can improve the performance of client devices or servers that access the network by timely providing the client devices and servers with the requested data.

Various elements, which are described herein in the context of one or more embodiments, can be provided separately or in any suitable subcombination. For example, the processes described herein can be implemented in hardware, or a combination of hardware and software. Further, the processes described herein are not limited to the specific embodiments described. For example, the processes described herein are not limited to the specific processing order described herein and, rather, process blocks can be re-ordered, combined, removed, or performed in parallel or in serial, or in response to another process block, as necessary, to achieve the results set forth herein.

It will be further understood that various changes in the details, materials, and arrangements of the parts that have been described and illustrated herein can be made by those skilled in the art without departing from the scope of the following claims.

We claim:

1. A method for predicting health of a link, the method comprising:
   (a) identifying, by a device in communication with a link, profile information of a stream of network traffic traversing the link, the profile information comprising a plurality of parameters about the link;
   (b) determining, by the device, a first prediction of health of the link by applying one or more rules to the plurality of parameters of the profile information;
   (c) determining, by the device, a second prediction of health of the link by applying a classifier to one or more timed sequences of the plurality of parameters of the profile information;
   (d) establishing, by the device, a respective weight for each of the first prediction of health and the second prediction of health;
   (e) selecting, by the device using the respective weight, between the first prediction of health and the second prediction of health to provide a predictor of the health of the link.

2. The method of claim 1, wherein (a) further comprises collecting, by the device, for the profile information the plurality of parameters comprising two or more of the following: latency, utilization, loss of packets, jitter, queue size, number of connections, and type of connection.

3. The method of claim 1, wherein (b) further comprises applying, by the device, the one or more rules as a function of the plurality of parameters comprising loss of packets, latency and jitter.

4. The method of claim 3, wherein the function is a sum of multiplying each of the plurality of parameters by a respective constant.

5. The method of claim 1, wherein (c) further comprises creating, by the device, the one or more timed sequences of the plurality of parameters responsive to the health of the link one of climbing above or falling below a predetermined threshold.

6. The method of claim 1, wherein (e) further comprises applying a function to a first weight of the first prediction of health and a second weight of the second prediction of health to select between the first prediction of health and the second prediction of health.

7. The method of claim 1, further comprising taking, by the device, an action associated with the link responsive to the predictor of the health of the link.

8. The method of claim 7, further comprising identifying, by the device via the selected predictor of the health of the link, that the link has high latency based on a predetermined latency threshold, and moving one or more connections with packet occupancy greater than a predetermined occupancy threshold in a queue to one or more other links.

9. The method of claim 7, further comprising identifying, by the device via the selected predictor of the health of the link, that the link has high jitter based on a predetermined jitter threshold, and moving one or more connections with a difference in inter-arrival time into the device and inter-departure time of a queue of the device is above a predetermined threshold.

10. The method of claim 7, further comprising identifying, by the device via the selected predictor of the health of the link, that the link has high loss based on a predetermined loss threshold and transmitting by the device a predetermined portion of bandwidth via the link.

11. A system for predicting health of a link, the system comprising:
 a device comprising a processor coupled to memory, and in communication with a link, the device configured to identify profile information of a stream of network traffic traversing the link, the profile information comprising a plurality of parameters about the link;
 a rule engine configured to determine a first prediction of health of the link by applying one or more rules to the plurality of parameters of the profile information;
 a classifier configured to determine a second prediction of health of the link by applying a classifier to one or more timed sequences of the plurality of parameters of the profile information;
 a weight adjuster configured to establish a respective weight for each of the first prediction of health and the second prediction of health;
 a prediction selector configure to select, using the respective weight, between the first prediction of health and the second prediction of health to provide a predictor of the health of the link.

12. The system of claim 11, wherein the device is further configured to collect for the profile information the plurality of parameters comprising two or more of the following: latency, utilization, loss of packets, jitter, queue size, number of connections, and type of connection.

13. The system of claim 11, wherein the rule engine is further configured to apply the one or more rules as a function of the plurality of parameters comprising loss of packets, latency and jitter.

14. The system of claim 13, wherein the function is a sum of multiplying each of the plurality of parameters by a respective constant.

15. The system of claim 11, wherein the device is further configured to create the one or more timed sequences of the plurality of parameters responsive to the health of the link one of climbing above or falling below a predetermined threshold.

16. The system of claim 11, wherein the predictor selector is configured to apply a function to a first weight of the first prediction of health and a second weight of the second prediction of health to select between the first prediction of health and the second prediction of health.

17. The system of claim 11, wherein the device is further configured to take an action associated with the link responsive to the predictor of the health of the link.

18. The system of claim 17, wherein the device is further configured to identify via the selected predictor of the health of the link, that the link has high latency based on a predetermined latency threshold, and move one or more connections with packet occupancy greater than a predetermined occupancy threshold in a queue to one or more other links.

19. The system of claim 17, wherein the device is further configured to identify via the selected predictor of the health of the link, that the link has high jitter based on a predetermined jitter threshold, and move one or more connections with a difference in inter-arrival time into the device and inter-departure time of a queue of the device is above a predetermined threshold.

20. The system of claim 17, wherein the device is further configured to identify via the selected predictor of the health of the link, that the link has high loss based on a predetermined loss threshold and transmit by the device a predetermined portion of bandwidth via the link.

* * * * *